H. GERDIEN.
APPARATUS FOR QUANTITATIVELY ANALYZING GASEOUS MIXTURES.
APPLICATION FILED JUNE 26, 1914. RENEWED OCT. 3, 1918.
1,304,037.
Patented May 20, 1919.
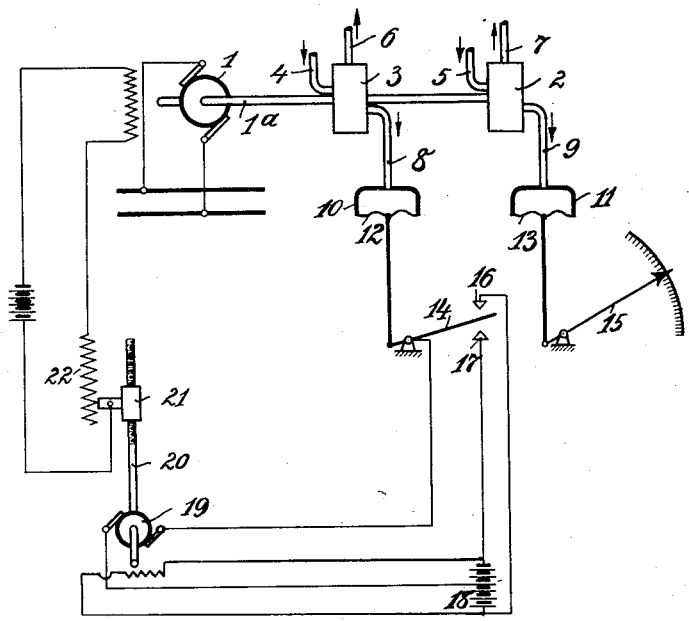

UNITED STATES PATENT OFFICE.

HANS GERDIEN, OF SCHMARGENDORF, NEAR BERLIN, GERMANY, ASSIGNOR TO SIEMENS & HALSKE, A. G., OF BERLIN, GERMANY, A CORPORATION OF GERMANY.

APPARATUS FOR QUANTITATIVELY ANALYZING GASEOUS MIXTURES.

1,304,037.      Specification of Letters Patent.      Patented May 20, 1919.

Original application filed July 18, 1913, Serial No. 779,883. Divided and this application filed June 26, 1914, Serial No. 847,473. Renewed October 3, 1918. Serial No. 256,764.

*To all whom it may concern:*

Be it known that I, HANS GERDIEN, a citizen of the German Empire, and residing at Schmargendorf, near Berlin, Germany, have invented a certain new and useful Improved Apparatus for Quantitatively Analyzing Gaseous Mixtures, of which the following is a specification.

My invention relates to processes of quantitatively analyzing gaseous mixtures containing known constituents.

The present application constitutes a division of my prior application filed July 18th, 1913, Serial No. 779,883, on method of quantitatively analyzing gaseous mixtures, which prior application matured into U. S. Letters Patent No. 1,133,556, dated March 30th, 1915.

In the copending patent application, which became a Patent No. 1,133,556, a process is described in which the difference of pressure of the gas at two places at different distances from the axis of a rotating centrifugal device is used for determining the quantity of each constituent part. In order to obtain the readings independently of pressure and temperature a second gas at the same pressure and temperature is rotated at the velocity of the first gas; the ratio of the difference of pressure of the two gases is used for measuring.

According to the present division of my invention, instead of this quotient being indicated I determine the quantity of each constituent by regulating the speed of the centrifugal device in dependence on the pressure of the comparison gas. For example, I arrange that a switch lever displaced in accordance with the pressure of the comparison gas can move between two contact-pieces placed close together, and that when the circuit containing the driving motor is closed over the one contact-piece the speed of rotation of the motor is increased, but when the said circuit is closed over the other contact-piece the speed is diminished.

A predetermined adjustable difference of pressure is maintained at the manometer of the comparison gas, this being effected independently of the fluctuation of the pressure and temperature of the comparison gas. If provision is made that the gases in the other centrifugal devices rotating with the same shaft have the same pressure and temperature as the comparison gas then the manometers connected to them give direct readings which are proportional to the average molecular weight of the mixtures to be analyzed and consequently to the quantity of each individual constituent part.

To these ends my invention comprises the apparatus such as described hereinafter and pointed out in the claims.

One form of apparatus adapted for carrying my improved process into practice is diagrammatically represented by way of example in the accompanying drawing.

Mounted on the common shaft $1^a$ driven by a motor 1 is a centrifugal device 2 for the gas to be analyzed and a centrifugal device 3 for the comparison gas. The gases are supplied through the pipes 4 and 5, respectively, to the centrifugal devices 3 and 2; for the sake of clearness it is assumed that the centrifugal gases escape through the pipes 6 and 7 into the open air, so that the pressure at the peripheries of the apparatus is equal to atmospheric pressure. The pressure transmitted through the pipes 8 and 9 to the devices, which will now be described, is below atmospheric. The gases communicate by way of the pipes 8 and 9 with the vessels 10 and 11, respectively, which are closed at one end by diaphragms 12 and 13, respectively. The movements of these diaphragms 12 and 13 are respectively transmitted to the switch lever 14 and the pointer 15. The lever 14 can play between two contact-pieces 16 and 17 located close together. A battery 18 is connected to these contact-pieces and to the one terminal of a motor 19 which can insert a larger or smaller part of the resistance 22 into the field circuit of the motor 1 by means of a spindle 20 carrying a nut 21. The other terminal of the motor 19 is connected to the lever 14.

If the circuit containing the battery 18 and the motor 19 is closed by the lever 14 at the contact-piece 16, for example, the motor 19 is fed in such manner that it cuts out resistance 22; when the lever 14 contacts with the contact-piece 17, on the contrary, resistance is cut in to the field circuit of the driving motor 1. The speed of this motor 1 is consequently subject to only small fluctuations. The position of the pointer 15 of the indicator for the gaseous mixture to be investigated will consequently change only according to the varying composition of the gaseous mixture.

I claim:—

1. Apparatus for quantitatively analyzing gaseous mixtures containing known constituents comprising in combination a pair of gas centrifuges, means for rotating them at the same speed, means for supplying a gaseous mixture to be analyzed and a comparison gas at the same pressure and temperature to said gas centrifuges respectively, and separate means controlled by the pressure of the gaseous mixture and the comparison gas respectively, at corresponding parts of the centrifuges, for indicating the respective pressure of the gaseous mixture and for regulating the speed of said centrifuges in accordance with the pressure of the comparison gas.

2. Apparatus for quantitatively analyzing gaseous mixtures containing known constituents comprising in combination a pair of gas centrifuges, means for rotating them at the same speed, means for supplying a gaseous mixture to be analyzed and a comparison gas at the same pressure and temperature to said gas centrifuges respectively, and separate means controlled by the pressure of the gaseous mixture and the comparison gas respectively, at corresponding parts of the centrifuges, for indicating the respective pressure of the gaseous mixture and for regulating electrically the speed of said centrifuges in accordance with the pressure of the comparison gas.

In testimony whereof I affix my signature in the presence of two witnesses.

HANS GERDIEN.

Witnesses:
   HENRY HASPER,
   WOLDEMAR HAUPT.